(12) United States Patent
Reader et al.

(10) Patent No.: US 8,718,399 B1
(45) Date of Patent: *May 6, 2014

(54) IMAGE WARP CACHING

(71) Applicant: Ambarella, Inc., Santa Clara, CA (US)

(72) Inventors: Sydney D. Reader, Milpitas, CA (US); Leslie D. Kohn, Saratoga, CA (US)

(73) Assignee: Ambarella, Inc., Santa, Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,535

(22) Filed: May 13, 2013

Related U.S. Application Data

(63) Continuation of application No. 12/972,789, filed on Dec. 20, 2010, now Pat. No. 8,447,134.

(51) Int. Cl.
*G06K 9/54* (2006.01)
*G06G 5/00* (2006.01)

(52) U.S. Cl.
USPC .............................. 382/275; 382/305; 345/647

(58) Field of Classification Search
USPC ......... 382/254, 255, 275, 276, 289, 296, 305, 382/307, 312; 345/419, 506, 604, 647, 648, 345/649; 358/1.16, 3.26, 3.27
See application file for complete search history.

(56) References Cited

U.S. PATENT DOCUMENTS

| | | | | |
|---|---|---|---|---|
| 5,867,166 | A * | 2/1999 | Myhrvold et al. | 345/419 |
| 5,931,918 | A * | 8/1999 | Row et al. | 719/321 |
| 6,008,820 | A | 12/1999 | Chauvin et al. | 345/502 |
| 6,326,964 | B1 * | 12/2001 | Snyder et al. | 345/419 |
| 7,184,059 | B1 | 2/2007 | Fouladi et al. | 345/604 |
| 7,188,316 | B2 * | 3/2007 | Gusmorino et al. | 715/764 |
| 7,536,487 | B1 | 5/2009 | Kohn | 710/52 |
| 7,602,423 | B2 * | 10/2009 | Silverbrook | 348/231.6 |
| 7,777,749 | B2 | 8/2010 | Chung et al. | 345/506 |
| 8,358,342 | B2 * | 1/2013 | Park | 348/143 |

* cited by examiner

*Primary Examiner* — Sheela Chawan
(74) *Attorney, Agent, or Firm* — Christopher P. Maiorana, PC

(57) ABSTRACT

An apparatus including a local shared memory and a processor. The local shared memory and the processor may be connected as a circuit. The local shared memory may comprise a plurality of cache blocks. Each of the cache blocks generally corresponds to one of a plurality of panes of a current horizontal strip of a warped image region to be generated from unwarped image data retrieved from an external source. The circuit may be further configured such that each pixel of the unwarped image data retrieved from the external source is fetched only once. Each of the panes has associated tag information.

20 Claims, 4 Drawing Sheets

IMAGE WARP CACHING

This is a continuation of U.S. Ser. No. 12/972,789, filed Dec. 20, 2010, which is incorporated by reference.

FIELD OF THE INVENTION

The present invention relates to image-capturing systems generally and, more particularly, to image warp caching.

BACKGROUND OF THE INVENTION

In image-capturing systems (still or video), there may be distortion of an image due to an imperfect optical system. The captured data is stored initially to an external dynamic random access memory (DRAM). For processing, small pieces of the captured data are read into a local, on-chip memory. Processing is performed on small pieces because a fast memory that is large enough to fit the entire image would not be economical. Vertical distortion across the width of the image can complicate image-processing algorithms that perform work on an image in individual horizontal strips.

It is desirable to minimize the amount of DRAM bandwidth used, to save power and/or to preserve bandwidth for other functions. It is also desirable to minimize the amount of local memory needed to process the image data. A fixed height local memory could minimize DRAM usage by only fetching the minimum number of rows of pixel data at a time as needed. However, as the vertical distortion across the width of the image becomes larger, a larger local buffer is needed in order to contain enough data to produce a single strip of undistorted image data.

It would be desirable to implement an image-capturing system that minimizes the overhead of dealing with image distortions.

SUMMARY OF THE INVENTION

The present invention concerns an apparatus including a circuit comprising a local shared memory and a processor. The local shared memory may comprise a plurality of cache blocks. Each of the cache blocks generally corresponds to one of a plurality of panes of a current horizontal strip of a warped image region to be generated from unwarped image data retrieved from an external source. The circuit may be further configured such that each pixel of the unwarped image retrieved from the external source is fetched only once. Each of the panes has associated tag information.

The objects, features and advantages of the present invention include providing image warp caching that may (i) minimize overhead, (ii) provide a novel cache organization, (iii) break an image into horizontal strips and break the horizontal strips into a number of separate panes, (iv) reduce a minimum height for local memory, (v) reduce memory bandwidth for fetches, (vi) fetch each pixel of an image only once from external memory, and/or (vii) use smaller size tag information than conventional techniques.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
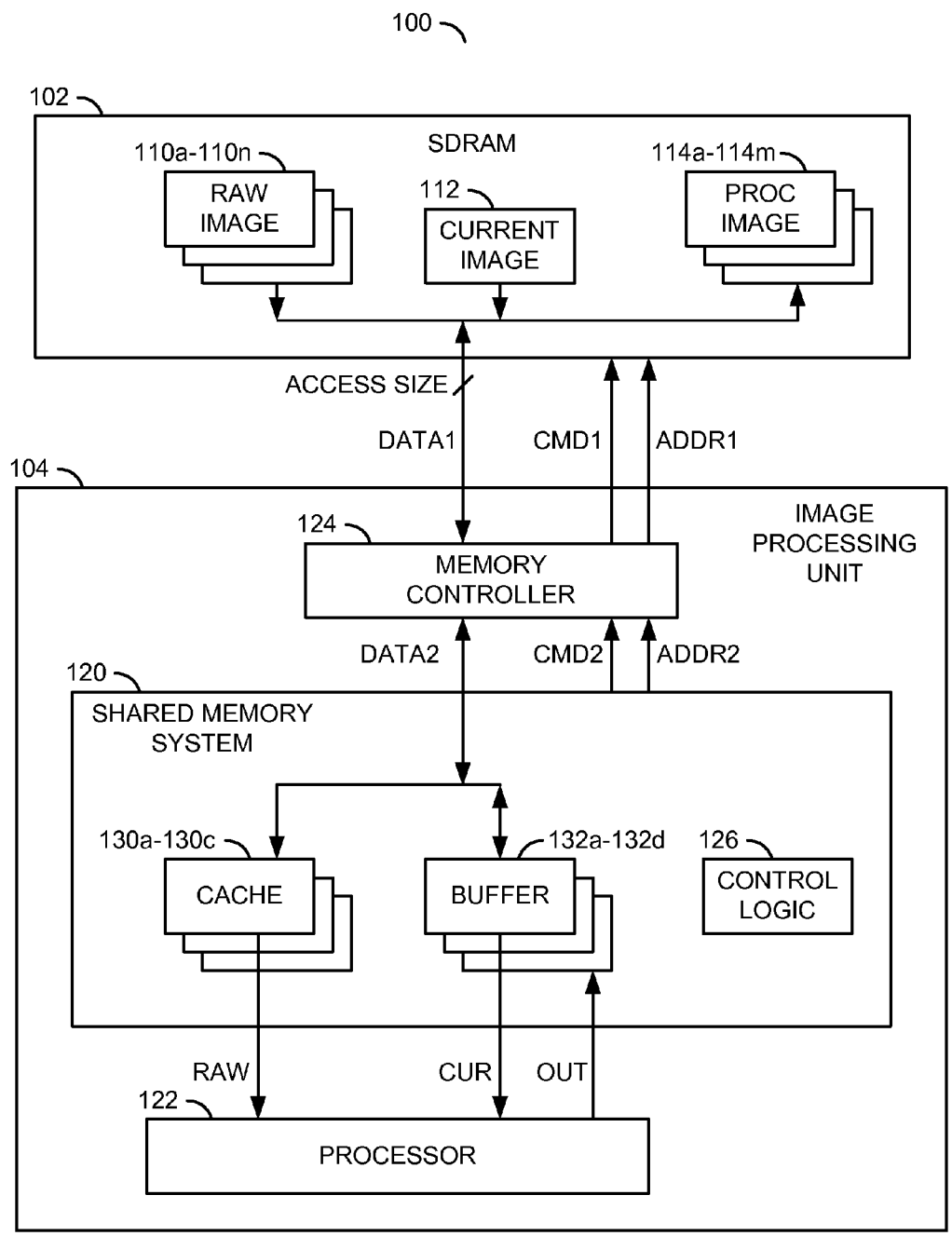
FIG. 1 is a block diagram illustrating an example implementation of an apparatus in accordance with a preferred embodiment of the present invention.

Referring to FIG. 1, a block diagram of an example implementation of an apparatus 100 is shown in accordance with a preferred embodiment of the present invention. The apparatus (or system) 100 may implement an image processing system. The apparatus 100 may be implemented as part of an image-capture system. In other embodiments, the apparatus 100 may be implemented along with an encoder/decoder or compressor/decompressor, also referred to as a CODEC. The CODEC may be configured to operate on still and/or video images.

The apparatus 100 generally comprises a circuit (or module) 102 and a circuit (or module) 104. A signal (e.g., ADDR1) may be generated by the circuit 104 and received by the circuit 102. The circuit 104 may also generate a signal (e.g., CMD1) received by the circuit 102. A signal (e.g., DATA1) may be exchanged between the circuit 102 and the circuit 104. The circuits 102 and 104 may be implemented in hardware, software, firmware or any combination thereof.

The circuit 102 may implement an external memory circuit with respect to the circuit 104. The circuit 102 may comprise, in one example, dynamic random access memory (DRAM). The circuit 102 may be configured, in one example, to buffer image data. The image data may comprise still and/or video images. For example, video image data generally comprises a sequence of images. Control of the circuit 102 may be achieved through addresses received via the signal ADDR1 and commands received via the signal CMD1. The image data may include, but is not limited to multiple raw images (e.g., pictures, frames, fields) 110a-110n, one or more current images 112 and data of one or more processed images 114a-114m.

Image data of the raw (or unprocessed) images 110a-110n may comprise captured or decoded pictures and/or video. The image data of the unprocessed images 110a-110n may be transferred between the circuit 102 and the circuit 104 via the signal DATA1. The signal DATA1 may also carry current samples of the current image 112. Processed samples of the processed images 114a-114m may be transferred from the circuit 104 to the circuit 102 via the signal DATA1. The circuit 102 is generally fabricated on a chip (or die). In one example, the circuit 102 is fabricated on a chip separate from the circuit 104. In some embodiments, the circuit 102 may implement a double data rate (DDR) synchronous dynamic random access memory (SDRAM). However, other memory technologies may be implemented accordingly to meet the design criteria of a particular application.

The circuit 104 may implement an image processing unit. The circuit 104 may be operational, in one example, to correct distortion of image data. In one example, the circuit 104 may be configured to correct distortion in image data due to imperfection(s) in an optical system used to capture the image data. The circuit 104 may be configured to minimize the overhead associated with compensation of distortion in a captured image. The circuit 104 may divide an image into a number of horizontal strips of image data. Each horizontal strip of image data may be further divided into a plurality of separate portions. The separate portions of a horizontal strip are referred to herein as panes. Each pane may be configured to contain enough data to reverse (or correct) the distortion for a corresponding horizontal section of the current horizontal strip. Raw (or unprocessed) samples, current samples and processed samples may be exchanged with the circuit 102 through the signal DATA1. Read/write access to the circuit 102 may be controlled by the circuit 104 using the signal ADDR1 and the signal CMD1. The circuit 104 is generally fabricated on a chip (or die) separate from the chip containing the circuit 102.

The circuit 104 generally comprises a circuit (or module) 120, a circuit (or module) 122 and a circuit (or module) 124. The signal DATA1 may be received by the circuit 124. A signal (e.g., RAW) may be generated by the circuit 120 and received by the circuit 122. The circuit 120 may generate a signal (e.g., CUR) that is also received by the circuit 122. A signal (e.g., OUT) may be generated by the circuit 122 and received by the circuit 120. The signal ADDR1 and the signal CMD1 may be generated by the circuit 124. A signal (e.g., ADDR2) may be generated by the circuit 120 and received by the circuit 124. A signal (e.g., CMD2) may be generated by the circuit 120 and received by the circuit 124. A signal (e.g., DATA2) may be exchanged between the circuit 120 and the circuit 124. The circuits 120 to 124 may be implemented in hardware, software, firmware or any combination thereof.

The circuit 120 may implement a shared local memory system. The circuit 120 is generally operational to buffer data (i) exchanged with the circuit 102, (ii) used by the circuit 122 and (iii) generated by the circuit 122. The circuit 120 may be logically configured as one or more caches and/or one or more buffers allocated to a portion of the shared memory and associated control registers of the circuit 120. Internal control logic 126 may generate the signal ADDR2, the signal CMD2 and internal memory addresses and controls based on requests received from the circuit 122.

The caches may include multiple numbers of caches. For example, one or more caches 130a-130c may be allocated in the circuit 120 in support of the image processing operations. For operations involving several reference images at once, a cache 130a-130c may be set up for each reference image involved in the operations. One or more buffers 132a-132d may also reside in the circuit 120 simultaneously with the caches 130a-130c. The caches 130a-130c and the buffers 132a-132d may be set up and torn down as appropriate by the circuit 122.

The circuit 122 may implement a processor. The circuit 122 is generally operational to perform various image processing operations on the image data buffered in the circuit 120. The image processing operations generally include correcting distortions in the image data. The image processing operations performed by the circuit 122 may further include video encoding, video decoding, or both video encoding and decoding. When decoding the video data, the circuit 122 may be operational to generate motion compensated reference blocks by performing motion compensations on the reference samples. Afterwards, the motion compensated reference blocks may be added to residual blocks to generated reconstructed blocks. The reconstructed blocks may be stored in the circuit 102 as part of a processed image (e.g., 114a). When encoding the video data, the circuit 122 may be operational to generate interpolated reference samples from the original reference samples. The interpolated reference samples may be used as part of a motion estimation operation to establish motion vectors for blocks in the current image 112. Other video codec operations may be implemented to meet the criteria of a particular application.

The circuit 124 may implement a memory controller. The circuit 124 may be operational to control the circuit 102. The circuit 124 may generate the signal ADDR1 and the signal CMD1 to control reading from and writing to the different addressable locations in the circuit 102. The signal ADDR1 and the signal CMD1 may be based on the signal ADDR1 and the signal CMD2 received from the circuit 120. Read/write access to the circuit 102 may be based on a smallest access size of the data carried by the signal DATA1. For example a DDR2 memory having a 32-bit external data width and a 4 word minimum burst mode may have a smallest access size of 16 bytes (e.g., 4 words/access at 4 bytes/word). The signal DATA2 may be used to transfer data between the circuit 120 and the circuit 124.

The local memory 120 may implement a novel cache organization in accordance with an embodiment of the present invention. The novel cache organization may minimize the overhead associated with correcting the distortions in the unprocessed (or raw) captured image data. In a first step, the captured image data is stored in the external memory 102 and a region representing a processed (or corrected) image may be defined. The region may be broken up into horizontal strips (or rows). The horizontal strips may be further divided into a plurality of separate portions that are referred to herein as panes. When the horizontal strips and panes of the processed image have been defined, the original unprocessed image may be divided into panes that correspond to the data for the final corrected image panes. Each of the horizontal strips is generally straight and regular (e.g., equal in height across the width of the strip). Each of the panes in a horizontal strip may contain enough image data to support reversal (correction) of the distortion associated with the horizontal portion (section) of the unprocessed image corresponding to the pane in the current horizontal strip. The minimum height of a buffer formed in the local memory of the circuit 120 may be reduced to a size that allows production of a single pane of undistorted image data. As the circuit 104 moves from one pane to the next pane in the same horizontal strip, the circuit 104 may provide a new vertical offset. The new vertical offset may indicate which data to fetch from the unprocessed image in the external memory 102 into the local memory 120.

As the circuit 104 finishes one row and moves to the next row, the processing unit 122 may determine whether there is any overlap between the pane from the previous row above and the pane of the current row being fetched. Generally, if any of the data for the current pane is already stored in the local memory 120, only new data is fetched from the unprocessed image data in the external memory 102. For some processing techniques, the data fetched for the processing unit 122 may appear to reach outside the boundary of the real image. In general, only real image data is fetched from the external memory 102 into the local memory 120 for subsequent use by the circuit 104. Both determining whether there is overlap and fetching only real image data may reduce the amount of memory bandwidth used by fetching only new data that is not already cached in the local memory 120.

Figure 2:
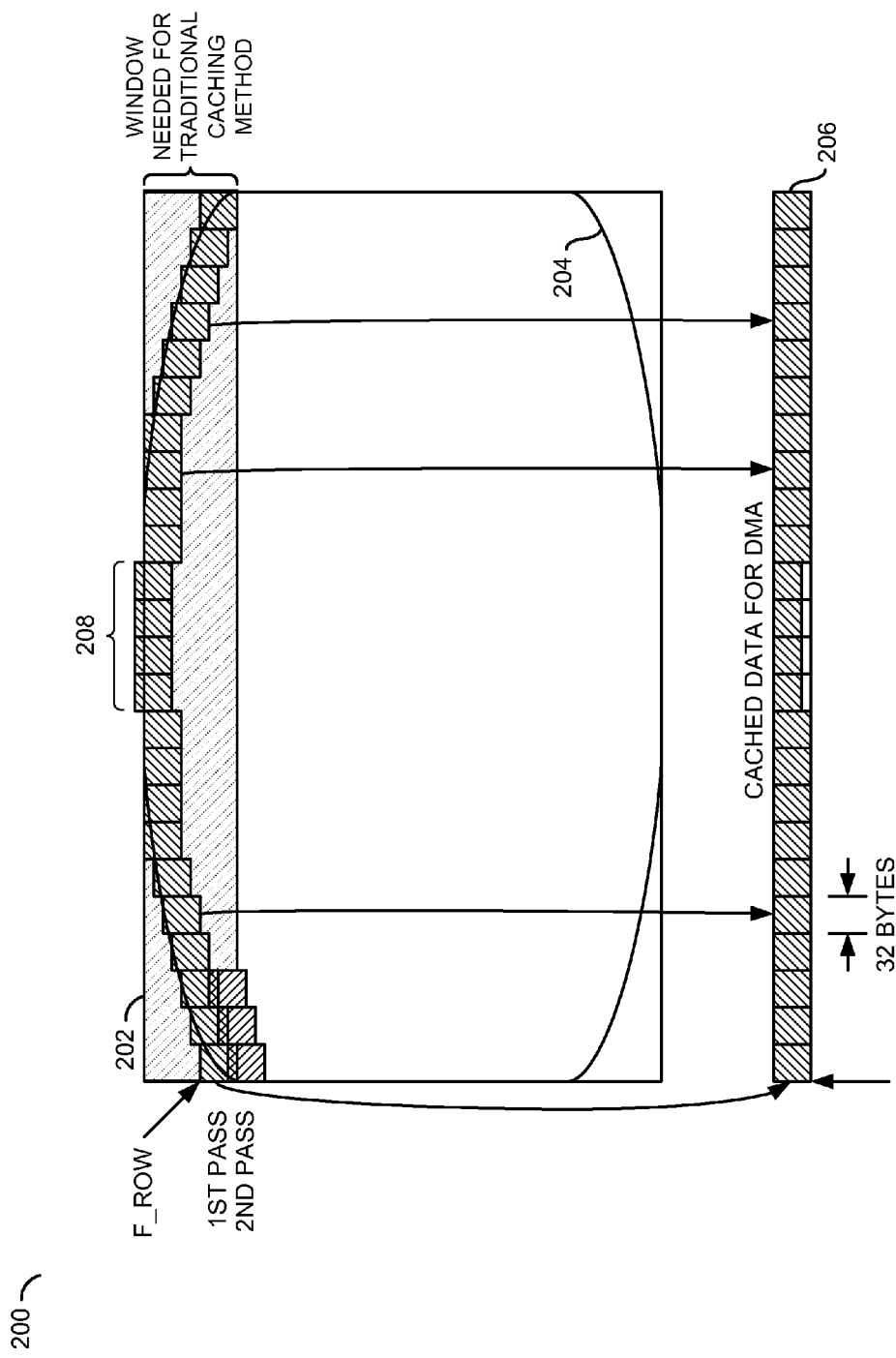
FIG. 2 is a diagram illustrating an example implementation of a video processing method in accordance with a preferred embodiment of the present invention.

Referring to FIG. 2, a diagram 200 is shown illustrating a process for caching data in accordance with an example embodiment of the present invention. In one example, the external memory 102 may store a frame 202 of image data. The image data of the frame 202 may include distortions 204. The distortions 204 may, for example, be due to imperfection(s) in an optical system used to capture the image data. During a first pass across the width of the frame 202, data may be stored into a cache buffer 206. The data is generally stored one pane at a time. For panes that extend outside a limit of the real image frame (e.g., the four panes 208), only the real image data within the frame 202 is transferred to the buffer 206. The amount of data transferred to the buffer 206 using the cache scheme in accordance with the present invention is generally less than the amount needed for conventional caching methods.

For each pane, information may be stored to indicate what data is cached in the current pane. In one example, the information stored may be referred to as a cache tag or tag information. In one example, the cache tag may include, but is not limited to, a first field containing a data valid flag (e.g., DATA_VALID), a second field indicating the location of the vertical offset of the start of data in the local memory (e.g., B_ROW), and a third field indicating which vertical offset the value BROW corresponds to in the total image (e.g., F_ROW). In one example, the first field DATA_VALID may be implemented as a single bit, the second field B_ROW may be implemented as 8 bits, and the third field F_ROW may be implemented as 14 bits. However, other size fields may be implemented accordingly to meet the design criteria of a particular implementation.

In addition to the cache tag information stored for each pane, buffer definition information may be stored on a once per buffer basis. The buffer definition information may include, but is not limited to, dimensions of the image (e.g., frame height, frame width), dimensions of the buffer in the local memory (e.g., buffer height), the width and height of the direct memory access (DMA) transfer, and the position in the buffer (e.g., B_COL). The buffer definition information may be stored elsewhere for the entire image, and is not generally stored for each pane. For example, the buffer definition information may be maintained by the control logic 126. The control logic 126 may then have immediate access to the definition information for each of the caches 130a-130c and buffers 132a-132d.

In cases where the data for the beginning of the image data appears to be above the real frame (e.g., panes 208), the field indicating the row of the real frame (e.g., F_ROW) may hold a negative value. The negative value may be used by the processing unit 122 to determine how much of the data is outside of the real frame.

Figure 3:
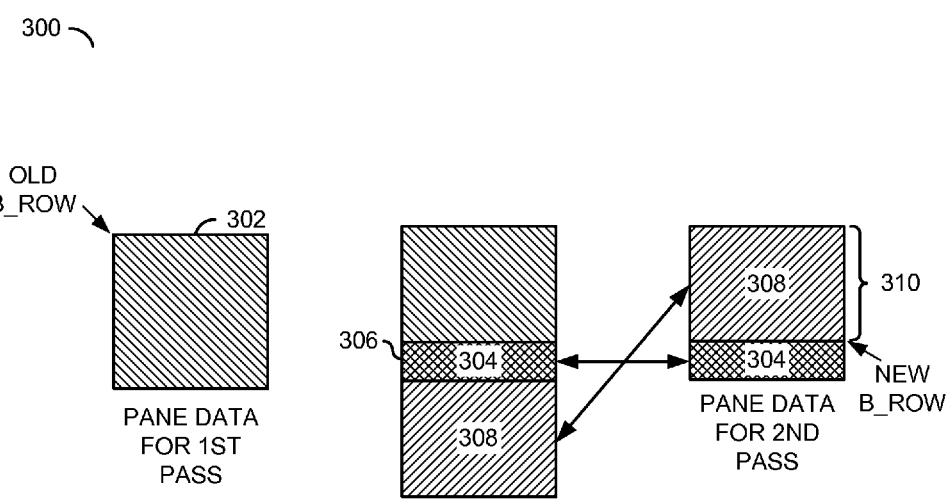
FIG. 3 is a diagram illustrating a process for updating cached data in accordance with an example embodiment of the present invention.

Referring to FIG. 3, a diagram 300 is shown illustrating a process for updating cached data in a pane in accordance with an example embodiment of the present invention. Data in a pane 302 may be updated between one pass and the next. In general, overlapping data between the two passes is preserved, while only new data is fetched into the pane. For example, overlapping data 304 between first and second passes may be retained in the original location 306, while new data 308 from the second pass is wrapped to fit in the pane buffer at location 310. The new data 308 generally overwrite the previous data at location 310. The value BROW is updated to reflect the new start row at the beginning of the location 306.

In one example, the size of the fields in the tag data to be stored per pane may be chosen based upon a maximum height of the frame and the maximum height of a DMA transfer. For example, the field F_ROW may be implemented as a 14-bit value when the maximum height of the frame is 8192 rows and the field BROW may be implemented as an 8-bit value when the maximum height of a DMA transfer is 256 rows. The width of the DMA may be chosen, in one example, to be 32 bytes. However, other values may be chosen to fit the design criteria of a particular implementation.

An example where the output DMA pane size is 26 vertical×32 bytes wide may be used to illustrate an advantage of the process in accordance with the present invention. If the distortion at the edges reaches 20% of the height of the frame, and the frame is 1080×1920 pixels, a conventional buffer scheme would need a large enough window to cover data for an entire pass across the width of the frame. With 20% distortion, the conventional scheme would need a window of height [(540×0.2)+26]=134 rows of pixels. To cover the entire width, assuming there are two bytes per pixel, would occupy (134×1920×2)=503 Kbytes of buffer space. The method in accordance with the present invention, on the other hand, may perform correction with space for only 26 rows of pixels allocated for the buffer, or (26×1920×2)=98 Kbytes.

To hide the latency of fetching new data from the external memory 102 to the processing unit 104, data may be loaded into the local memory 120 using a prefetch mechanism. The vertical offset for a particular pane may be provided several panes in advance of use in order to cover the possible latency of the external access to DRAM. After receiving the vertical offset, the current contents of the local memory 120 for the particular pane may be checked. Subsequently, only new data that is not currently in the local memory 120 may be fetched from the external memory 102. The cache information may then be updated to indicate the new valid data within the local memory 120 for the particular pane. The prefetch mechanism generally allows the data to be available when the processing unit 122 is ready to receive the data, without imposing a delay on the processing unit 122 to wait for access to the external memory 102.

Another advantage of an image processing system in accordance with an embodiment of the present invention is that each pixel from the frame may be guaranteed to be fetched only once from the external memory 102, rather than potentially having multiple misses for the same data. Additionally, larger and/or more efficient DRAM transactions may be generated than for conventional caches that implement individual 16 or 32 byte lines. The size of the tag information used for each pane may also be smaller than conventional cache implementations.

The local data memory and cache storage information for the image may be implemented in the shared memory structure 120. Allocation of the amount of data used for each image may be flexible. For example, allocation may be performed by specifying the size of each pane, the number of panes, and the base address. The shared memory structure 120 may also be used to hold other types of data including cache organizations to provide optimized cache organizations for various usage scenarios. For example, a memory hierarchy as described in U.S. Pat. No. 7,536,487, which is incorporated herein by reference in its entirety, may be implemented. In addition to correction of geometrical distortions, the method in accordance with the present invention may be used in other applications where the order of data fetched from an external memory does not follow a simple path straight across the frame (e.g., rotation of an image, perspective view graphics user interface (GUI) effects, etc.).

Figure 4:
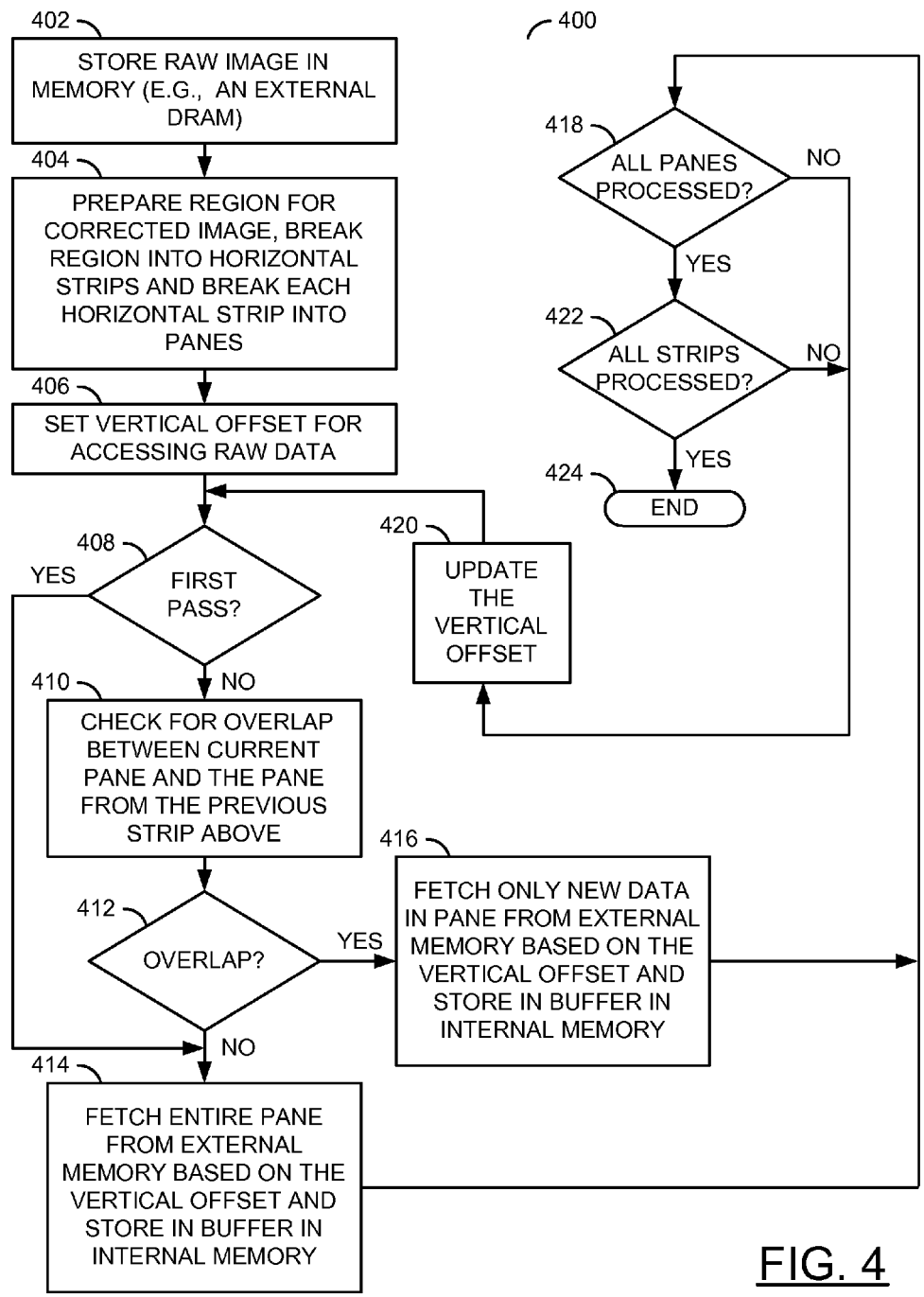
FIG. 4 is a flow diagram illustrating an example method for controlling the cache module during a distortion correction process.

Referring to FIG. 4, a flow diagram is shown illustrating a process (or method) 400 implementing image warp caching in accordance with an example embodiment of the present invention. The process (or method) 400 may comprise a step (or state) 402, a step (or state) 404, a step (or state) 406, a step (or state) 408, a step (or state) 410, a step (or state) 412, a step (or state) 414, a step (or state) 416, a step (or state) 418, a step (or state) 420, a step (or state) 422, and a step (or state) 424. In the step 402, the process 400 may store raw, generally unprocessed data for a unwarped (or acquired) image in memory (e.g., the external memory 102). The raw (or unwarped) data is generally unprocessed with respect to distortion correction or other processing for which the process 400 has been initiated. For example, an arbitrary non-bottle-necked image warp, including rotation, scaling, perspective transformation, etc., may be applied to the unwarped image data. However, some processing (e.g., black level adjustment, dynamic range adjustment, color space selection, etc.) may have been performed on the raw unwarped image data prior to performing the distortion correction or other image warp. When the image is stored in the external memory, the process 400 may move to the step 404.

In the step 404, the process 400 may define a region for storing the processed (or warped) image. The process 400 may then break up the processed image region into horizontal strips (or rows) and break up the horizontal strips into panes. In one example, the buffer definition information in the control logic 126 may describe how to divide up the image. For example, a base address for the image may be defined first, and then a pointer may be used to indicate the location of the current pane ready for processing. The pointer may be incremented, in one example, by an increment value that is also part of the buffer definition information. When the region for the processed image data has been divided into panes, the process 400 may move to the step 406.

In the step 406, a variable may be set identifying a vertical offset for a pane to be fetched. In one example, the processor 122 may be configured to generate the vertical offsets. The vertical offsets may be provided to the internal memory 120, in one example, by the processor 122 issuing prefetch commands to the shared memory system. Alternatively, the vertical offsets may be generated in the control logic 126. However, because the information is fairly specific to the warp correction and generally is not applicable to most of the other uses of the shared memory system, the information is generally maintained by the processor 122 for working on the data. When the vertical offset has been determined, the process 400 may move to the step 408.

In the step 408, the process 400 may determine whether or not the current pass is the first pass. If the current pass is the first pass, the process 400 may move to the step 414, where the entire pane is fetched from the external memory 102 and stored in a corresponding cache block (e.g., blocks 130a-130c) of a buffer (e.g., buffer 206) in a local (internal) shared memory. If the first pass is completed and the process 400 is performing a subsequent pass, the process 400 may move to the step 410.

In the step 410, the process 400 may check to see whether there is an overlap between the current pane and the pane from the previous strip above the current pane, then move to the step 412. In the step 412, if there is no overlap, the process 400 may move to the step 414. Otherwise, the process 400 may move to the step 416. In the step 414, the process 400 may fetch the entire pane from the external memory 102 and store the pane in the corresponding cache block (e.g., blocks 130a-130c) of the buffer (e.g., buffer 206) in the internal shared memory. In the step 416, the process 400 may fetch only the new data of the current pane from the external memory and store the new data of the current pane in the corresponding cache block of the buffer in the internal shared memory. The new data is stored such that the overlap data remains intact in the cache block.

When the appropriate data of the current pane has been stored in the buffer, the process 400 may move to the step 418. In the step 418, the process 400 may determine whether all the panes in the current horizontal strip have been processed. If there are still panes to be processed in the current horizontal strip, the process 400 may move to the step 420. If all of the panes in the current horizontal strip have been processed, the process 400 may move to the step 422. In the step 420, the process 400 may update the vertical offset for the next pane to be fetched and move to the state 408. In the step 422, the process 400 may determine whether all the horizontal strips in the image have been processed. If all of the horizontal strips have not been processed, the process 400 may move to the step 420 to update the vertical offset for the first pane in the next horizontal strip and move to the step 408. If all the horizontal strips in the image have been processed, the process 400 may move to the step 424, where the process 400 ends.

The present invention may implement a cache pane size equal to the size of one operation of a processing unit. Different vertical offsets may be used for each pane. A prefetch mechanism may be implemented that only fetches new data from within the real image that is not already stored from the pane above the current one. Cache data may be stored in a shared memory structure which may be configured for various types of caching including, but not limited to, multiple reference frames with a variable vertical range size.

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIG. 1 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a local shared memory; and
a processor, wherein (i) said local shared memory and said processor are connected as a circuit, (ii) said local shared memory comprises a plurality of cache blocks, where each of the cache blocks corresponds to one of a plurality of panes of a current horizontal strip of a warped image region to be generated from unwarped image data retrieved from an external source, (iii) said circuit is further configured such that each pixel of the unwarped image data retrieved from the external source is fetched only once, and (iv) each pane has associated tag information.

2. The apparatus according to claim 1, further comprising a memory controller configured to interface said circuit with an external memory device, wherein said unwarped image data is stored in said external memory device.

3. The apparatus according to claim 2, wherein said circuit further comprises a prefetch mechanism configured to fetch only new data, from within real image data of the unwarped image data stored in the external memory device that is not already stored from the pane above a current pane.

4. The apparatus according to claim 1, wherein a size of said panes is determined by a size of one operation of said processor.

5. The apparatus according to claim 1, wherein a vertical offset is set independently for each pane.

6. The apparatus according to claim 1, wherein cache data is stored in a shared memory structure configurable for a plurality of types of caching.

7. The apparatus according to claim 6, wherein the types of caching include multiple reference frames with variable vertical range size.

8. The apparatus according to claim 1, wherein said tag information comprises a data valid field, a first row field and a second row field.

9. The apparatus according to claim 1, wherein a size of the cache blocks is set to provide a sufficient amount of data to correct distortion for a corresponding section of the current horizontal strip.

10. A method of correcting distortion in an image, said method comprising the steps of:
during a first pass, fetching data of an unwarped image corresponding to each of a plurality of panes of a current one of a plurality of horizontal strips forming a region of a warped image based upon a respective vertical offset; and
storing the fetched data of each pane in a corresponding cache block of a local shared memory of a processing device, wherein a size of each corresponding cache block is set to provide a sufficient amount of data to correct distortion in a corresponding section of the current horizontal strip and each pane has associated tag information.

11. The method according to claim 10, wherein the vertical offset is set independently for each pane.

12. The method according to claim 10, wherein the data of the unwarped image is stored in a memory device.

13. The method according to claim 12, further comprising:
during each pass after the first pass, fetching only new data of a current pane that is not already stored from the pane above a current pane.

14. The method according to claim 13, wherein the new data is only fetched from within real image data of the unwarped image stored in the memory device.

15. The method according to claim 10, wherein said tag information comprises a data valid field, a first row field and a second row field.

16. An apparatus comprising:
means for storing data locally; and
means for processing data, wherein (i) said means for storing data locally comprises a plurality of cache blocks, where each of the cache blocks corresponds to one of a plurality of panes of a current horizontal strip of a warped image region to be generated from unwarped image data retrieved from an external source, (iii) said processing means is further configured such that each pixel of an unwarped image received from the external source is fetched only once, and (v) each pane has associated tag information.

17. The apparatus according to claim 16, wherein said external source comprises a memory device storing said unwarped image.

18. The apparatus according to claim 17, wherein said means for storing data locally and said means for processing data are implemented on a separate integrated circuit from said memory device.

19. The apparatus according to claim 16, wherein a size of the cache blocks is set to provide a sufficient amount of data to correct distortion for a corresponding section of the current horizontal strip.

20. The apparatus according to claim 16, wherein said means for storing data locally and said means for processing data are part of a camera on a chip.

* * * * *